J. SENFT.
CHAIN WELDING MACHINE.
APPLICATION FILED OCT. 30, 1919.

1,360,034.

Patented Nov. 23, 1920.
5 SHEETS—SHEET 1.

Inventor:—
John Senft.
by his Attorneys
Houson & Houson

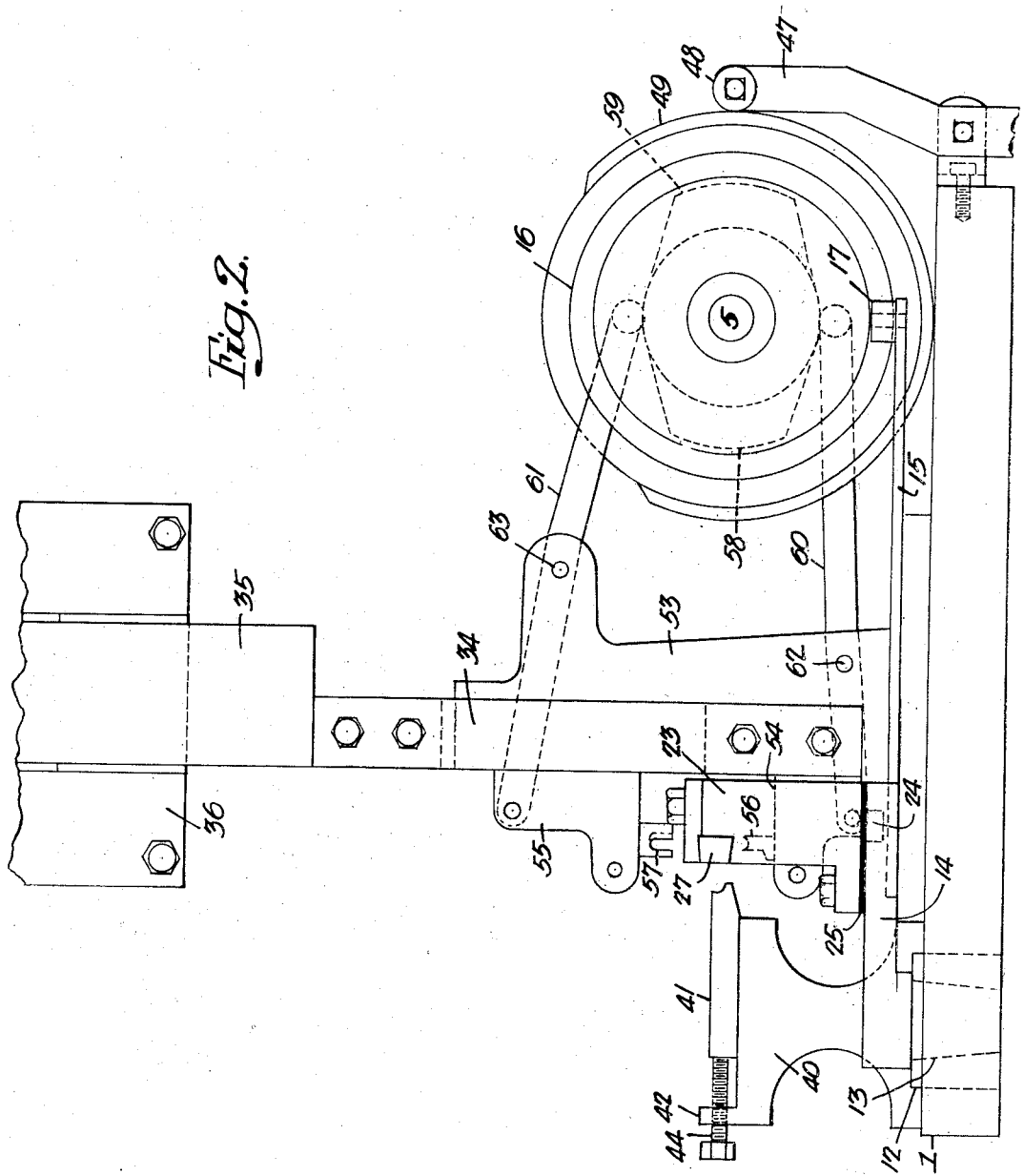

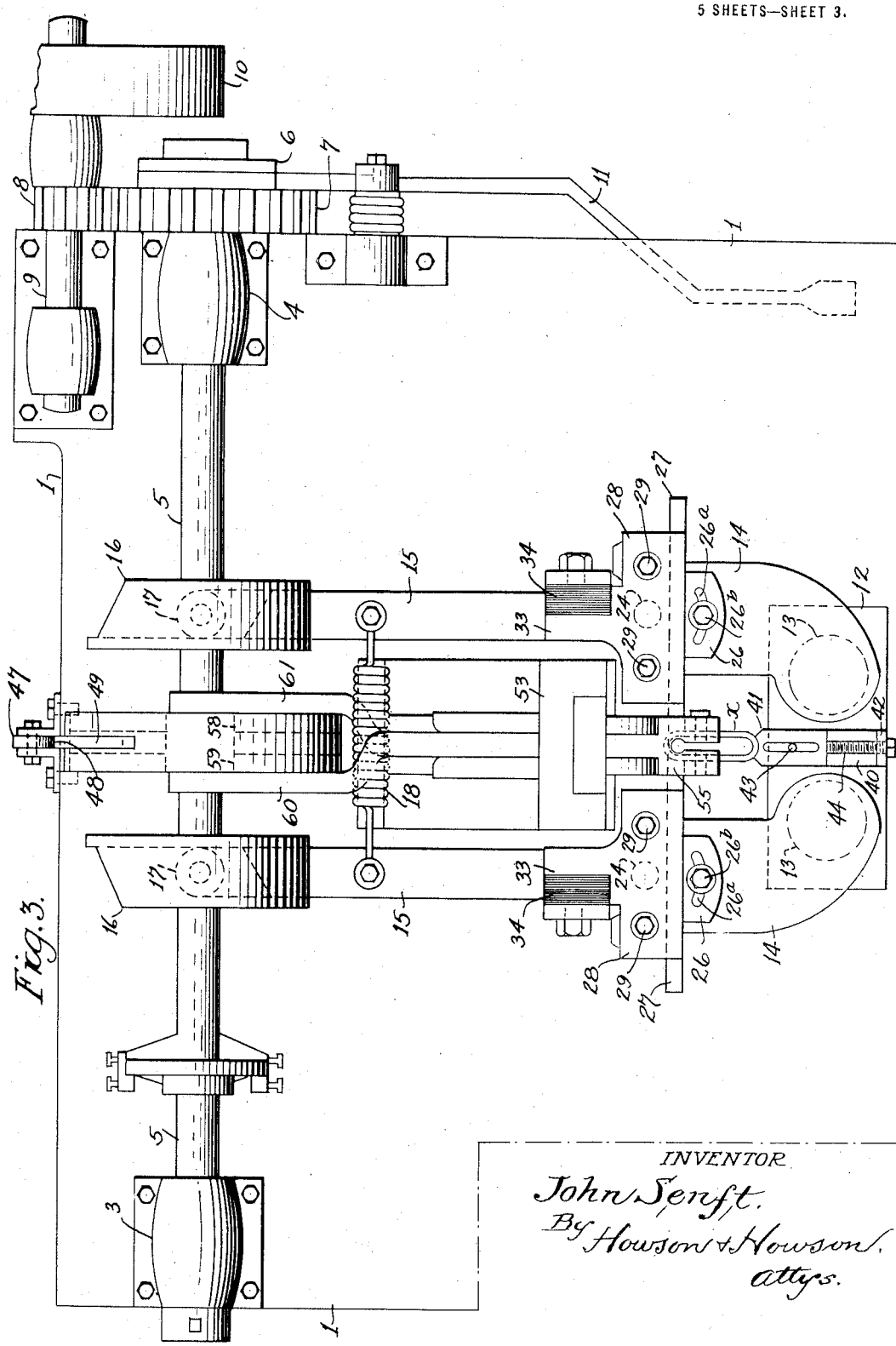

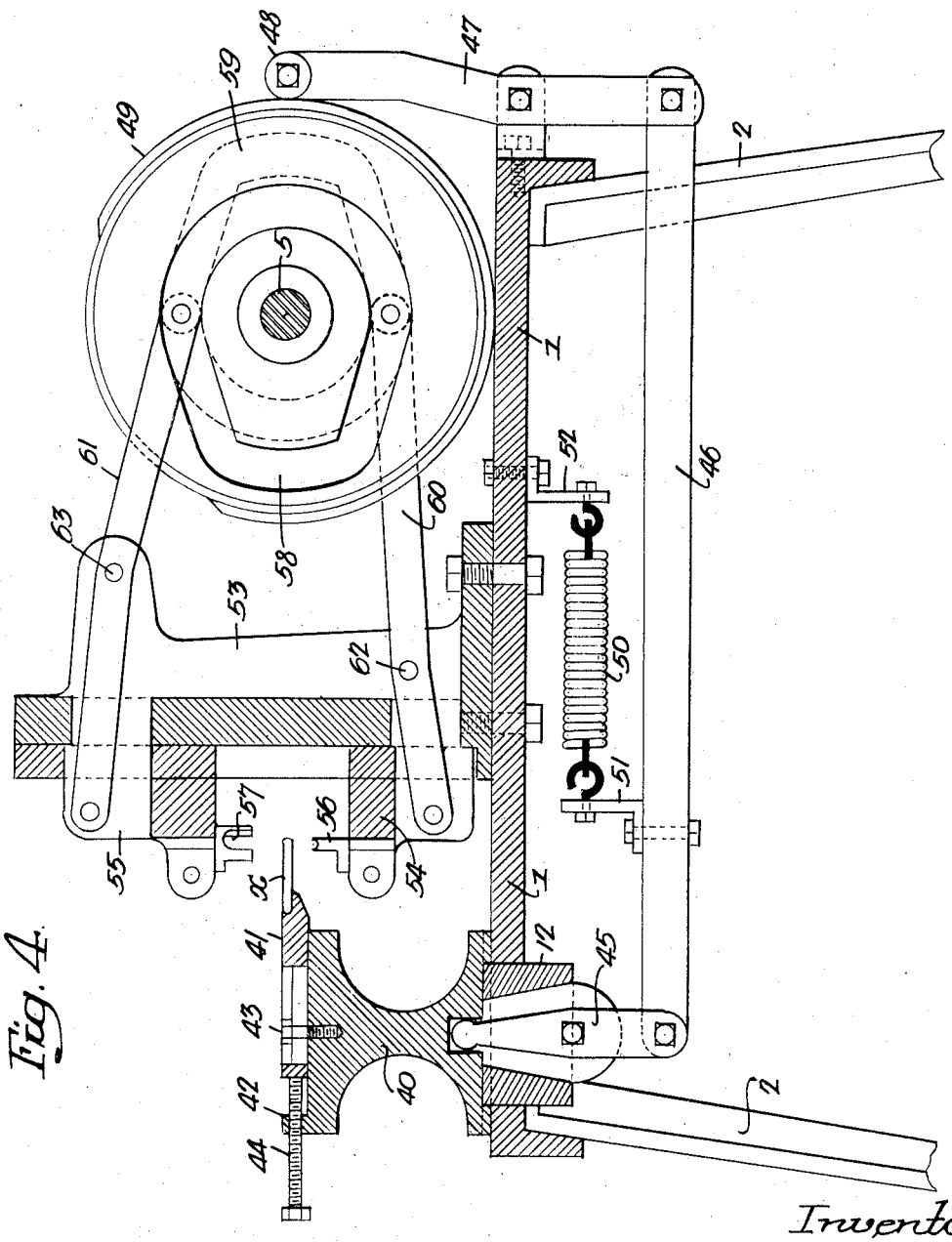

J. SENFT.
CHAIN WELDING MACHINE.
APPLICATION FILED OCT. 30, 1919.
1,360,034.
Patented Nov. 23, 1920.
5 SHEETS—SHEET 5.
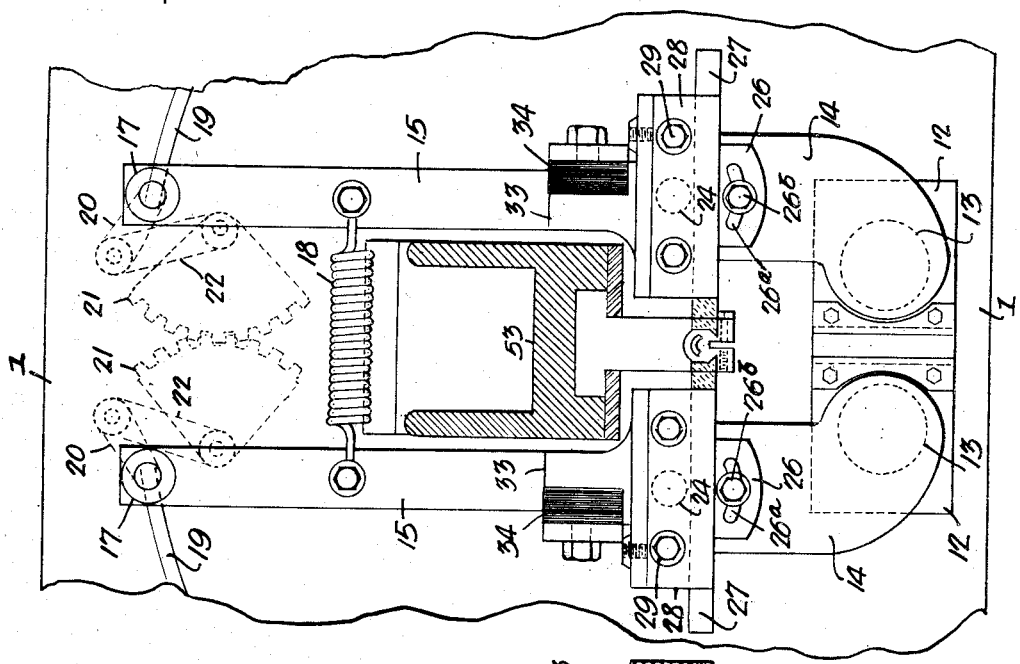
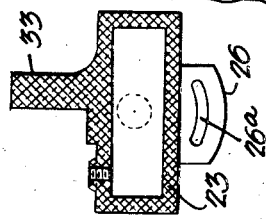
Inventor—
John Senft,
by his Attorneys
Howson & Howson

UNITED STATES PATENT OFFICE.

JOHN SENFT, OF YORK, PENNSYLVANIA, ASSIGNOR TO UNITED STATES CHAIN AND FORGING COMPANY, OF PITTSBURGH, PENNSYLVANIA, A CORPORATION OF DELAWARE.

CHAIN-WELDING MACHINE.

1,360,034.  Specification of Letters Patent.  Patented Nov. 23, 1920.

Application filed October 30, 1919. Serial No. 334,398.

*To all whom it may concern:*

Be it known that I, JOHN SENFT, a citizen of the United States, residing in York, Pennsylvania, have invented Chain-Welding Machines, of which the following is a specification.

One object of my invention is to provide a relatively simple, substantial and compact machine for electrically welding previously formed chain links, the construction being such that the machine is especially adapted for, without being limited in its use to, welding the adjacent end portions of elongated link blanks.

I further desire to provide a machine of the type noted in which the transformer for supplying the current employed in welding shall be so mounted and connected with the work engaging electrodes as to reduce to a minimum the number of joints, and likewise reduce the electrical resistance, of the welding circuit;—the invention contemplating also a novel form of water cooled electrode holder designed to efficiently reduce the temperature of those portions of the machine which tend to become objectionably heated during operation.

I also desire to provide a novel combination of link supporting guide, particularly designed to avoid complication and of such a nature as to make possible the operation of the machine for long periods of time without necessity for repairs.

It is further desired to provide a welding machine with a novel arrangement and construction of the parts constituting the secondary or welding circuit, with a view to shortening and simplifying the same.

These objects and other advantageous ends I attain as hereinafter set forth, reference being had to the accompanying drawings, in which, Figures 1 and 2 are respectively a front and a side elevation of the main portions of an electric welder constructed in accordance with my invention;

Fig. 3 is a plan of the machine shown in Figs. 1 and 2, with the transformer removed and the conductors from the latter in section;

Fig. 4 is a vertical section on the line 4—4, Fig. 1, the electrodes and their supporting structures being omitted;

Fig. 5 is a horizontal section on the line 5—5, Fig. 1, with the laminated conductors omitted; and Fig. 6 is a transverse section on the line 6—6, illustrating the detail construction of the water jacket for the electrode holders.

Figure 1:
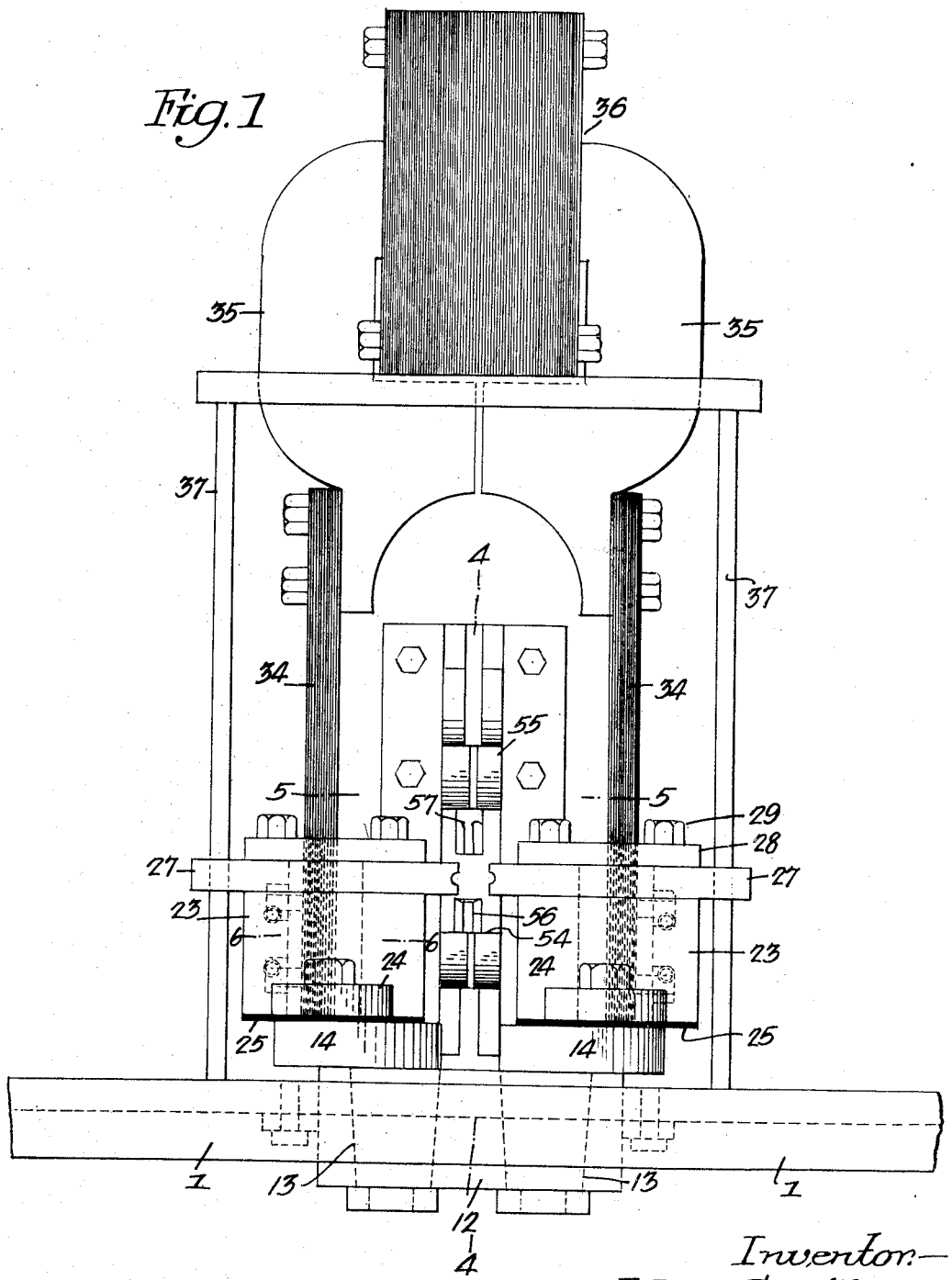

In the above drawings 1 represents a base structure supported in a horizontal position upon suitable legs 2 and adjacent its rear edge supporting bearings 3 and 4 for a main shaft 5. The latter has fixed to it one member of a clutch 6 whose second member is fixed to a gear 7 loosely rotatable on said shaft and meshing with a second gear 8 upon a second shaft 9 continuously driven through a pulley 10 from any suitable source of power. The clutch, which is preferably of the automatic releasing type well known in this art, is controlled by suitable means such as the pedal 11 which extends to the forward part of the machine so as to be within convenient reach of the operator.

Mounted at the center of the front of the machine is a relatively heavy block or plate 12 providing downwardly tapering bearings for correspondingly tapered journals 13 forming part of two lever heads 14 which are curved away from each other and are then extended toward the rear of the machine so as to lie approximately parallel. The rear ends of these heads have connected to them lever arms 15 which extend to points under and immediately adjacent the shaft 5 which has fixed to it cams 16 designed to operate on rollers 17 carried by said lever arms so as to swing them apart. The latter are at all times drawn together by a relatively heavy spring 18 connected to and extending between them and the pin or spindle forming the pivot for each of the rollers projects through a slot 19 in the base or table top 1 to the under side thereof where it has loosely mounted on it one end of a link 20. Pivoted to the under side of the base 1 adjacent the slots 19 are two toothed segments 21 whose teeth engage each other as shown in Fig. 5 and which are respectively fixed to suitable spindles or pins to each of which is fixed one end of an arm 22 whose opposite end is pivotally connected to one of the links 20.

With this arrangement of parts, any movement of one of the levers 15 is transmitted to the other, and they are thus caused to swing on their journals 13 to equal amounts in opposite directions. Each of the lever heads 14 has mounted upon its rear portion an electrode holder 23 preferably made hollow and is provided with a recess for the reception of a post or pivot projecting downwardly from the under side of said head into a suitable recess in the lever head, as indicated at 24 in Fig. 2. Each of the electrode holders is insulated from its supporting lever head 14 by any suitable means such as the mica or fiber plate 25, although it is adjustable in a horizontal plane on its pivot 24. For this purpose each of the holders is formed with a forwardly projecting lug 26 having a slot 27 concentric with its pivot 24 for the reception of a bolt 28 whereby said holder may be clamped to the lever head 14 in any adjusted position.

The electrode holders have in their front faces transversely extending undercut recesses for the reception of two electrodes 27 which extend in line with each other and are clamped to their respective holders by plates 28 held to the tops thereof by clamping bolts 29. The adjacent ends of the electrodes are recessed to properly receive the open or separated ends of a link blank $x$ to be welded and said electrodes may be adjusted toward or from each other after the bolts 29 have been slacked off to relieve the pressure on the plates 28. Each of these holders is hollow and has suitable connections 30 and 31 leading respectively from a source of cooling water and to a waste pipe whereby the water may be circulated through them so as to prevent their undue heating under operating conditions.

As shown in Fig. 2 and Fig. 6, each of the electrode holders has a flat rearwardly projecting, vertically extended lug 33 designed for connection to the lower end of a laminated and more or less flexible electrical conductor 34 whose upper end is bolted to the secondary 35 of an alternating current transformer 36. The latter is supported above the electrode holders upon a frame 37 carried by the base or table 1 and the arrangement is such that the vertically extending conductors 34 are capable of moving toward and from each other to permit of the movement of the lever arms 15 under the action of the cams 16 and spring 18 as the electrodes are moved into and out of positions in which they electrically engage the end of a link to be welded.

At the front of the machine and midway between the journals 13 of the electrode heads I form a guideway in the top of the block 12 and slidably mount in this a carriage 40. On the top of this carriage I mount a holder 41 slotted to receive a stud 43 screwed into the top of the carriage and engaged by an adjusting screw 44 threaded through a lug 42 at the forward edge of said carriage.

The rear end of the holder 41 is shaped to support the closed end of the link and to insure its being retained in intimate engagement with the two electrodes 27 during the heating operation the carriage 40 is slidably guided in the block 12 as shown so as to be movable toward and from the rear of the machine, for which purpose I provide a lever 45 extending through and fulcrumed in said block with its lower end connected through a link 46 with the lower end of a lever 47. The latter extends upwardly from said link and is fulcrumed to the rear portion of the base 1, having at its upper end a roller 48 designed to coact with the periphery of a cam 49 fixed to the shaft 5 between the cams 16.

A spring 50 acts between two brackets 51 and 52 respectively mounted on the link 46 and on the under side of the base 1, so as to normally retain the carriage 40 with the holder 41 in a forward position most distant from the electrodes 27 and the cam 49 is of such an outline as to move said carriage with said holder toward the electrodes and temporarily hold it in this position once during each revolution of the shaft 5.

Also mounted on the base 1 to the rear of the electrode holders 23 is a centrally placed standard 53 providing a guideway for two vertically movable heads 54 and 55. These carry lower and upper dies 56 and 57 projecting toward each other and having their adjacent faces recessed in the well known manner so that they are capable of coacting to shape the welded ends of a link. For actuating these dies the opposite faces of the rotary element carrying the cam 49 are grooved to provide cams 58 and 59 designed to respectively receive rollers on the rear ends of the levers 60 and 61. The latter project forwardly to and through openings in the standard 53 to which they are fulcrumed at 62 and 63 and their forward ends are respectively pivoted to the die-carrying heads 54 and 55.

When the machine is at rest the dies 56 and 57 are separated, the carriage 40 is at the forward end of its path of movement and the levers 15 with electrode holders 23 are in such positions that the electrodes 27 are separated. A link to be welded is preferably threaded through a previously welded link and is then placed by hand with its open end between the electrodes and its opposite closed end resting upon or in position to be engaged by the holder 41 of the carriage 40. By a depression of the pedal 11, the operator causes closing of the clutch 6 so that power is transmitted from the shaft 9 through the gears 8 and 7 and through the clutch 6 to the main shaft 5 which is caused to make one complete revolution and then come to rest. The cams 16 thereafter so act upon the lever arms 15 that the electrode holders are allowed to turn on their journals 13 as pivots under the action of the spring 18, thereby causing the electrodes to grip the open end of the link and force its separated extremities toward and into engagement with each other. At the same time the carriage 40 moves to the rear sufficiently to cause its holder 41 to engage and strongly press the link toward and into intimate engagement with the electrodes.

By any suitable means such as a cam on the shaft 5, the circuit of the primary winding of the transformer 36 is closed, with the result that current of relatively large volume is induced in the secondary winding 35 and flows therefrom through the conductors 34 to the holders 23 thence to the electrodes 27 and through the contacting ends of the link. This current is of sufficient amount to heat and shortly raise to a welding temperature the engaged extremities of the link and the cams 58 and 59 are of such design that they actuate the levers 60 and 61 to move the dies 56 and 57 toward each other at the time said temperature has been attained. These dies operate between the ends of the electrodes 27 and give the proper shape to the highly heated metal, after the switch has cut off the current from the electrodes and while these are still coöperating with the carriage 40 to hold the link stationary. Thereafter the dies 56 and 57 are separated by their controlling cams, the electrodes are moved apart against the action of the spring 18 by the cams 16, and the peripheral cam 49 also causes movement of the carriage 40 away from the electrodes under the action of the spring 50. The finished link is then removed or allowed to drop and another link to be welded is presented to the machine either after being threaded through the previously formed link or independently thereof.

From the above description it will be noted that when the cams 16 allow the spring 18 to force the electrodes 27 toward each other, the relatively flexible conductors 34 are bent sufficiently to permit the described operation without injury to the machine and their arrangement is such as to avoid the necessity for any conduction of current between slidably engaging surfaces, since said conductors are rigidly bolted or otherwise immovably connected to the secondary winding 35 as well as to the two electrode holders 23.

Under conditions of use water is circulated through these holders so as to prevent an objectionable rise in the temperature of the electrodes, which from time to time may be adjusted toward each other, after the clamping bolts 29 have been slacked off, in order to compensate for the wear which occurs.

Altogether the machine is compact and substantial, as well as of a durable construction and relatively inexpensive owing to the fact that the arrangement of the transformer conductors and electrode holders is such as to require but relatively little copper or other metal of high conductivity in the short secondary circuit.

I claim:

1. The combination in an electric welding machine of a supporting structure; two levers mounted thereon; means for swinging said levers toward and from each other; electrodes carried respectively by the levers; means for supplying current to said electrodes; vertically movable dies; means for causing said dies to act on a link after this has been welded between the electrodes; and means for forcing the link toward the electrodes into position to be acted on by the dies.

2. The combination in an electric welding machine of a supporting structure; two levers fulcrumed thereon so as to be movable toward and from each other; electrode holders carried by the levers; means for actuating the levers; electrodes carried by the holders; means for supplying current to the electrodes; a carriage movable toward and from the electrodes; and dies for shaping the link after it has been moved to a predetermined position by said carriage.

3. The combination in an electric welding machine of a supporting structure; levers mounted thereon to swing in a substantially horizontal plane; electrodes rigidly mounted on said levers and movable toward and from each other; means for actuating said levers; a carriage movable in a line at right angles to the line of action of the electrodes for forcing the link toward the same; and two vertically movable dies operative to shape a link while it is held by said electrodes and carriage.

4. The combination in an electric welding machine of a supporting structure; two levers pivotally supported thereon; means for swinging the levers toward and from each other; electrode holders pivotally mounted on said levers; means for retaining said holders in any adjusted position on their pivots; electrodes carried by the holders; and a source of current electrically connected to the holders.

5. The combination in an electric welding machine of a supporting structure; two lever heads pivotally mounted thereon; lever arms rigidly connected to said heads respectively and extending in substantially parallel relation rearwardly therefrom; means for swinging said lever heads in a substantially horizontal plane; electrode holders mounted on the heads; electrodes carried by the holders; dies for shaping a link while it is held by the electrodes; and means for forcibly moving the link rearwardly between the electrodes into position to be shaped by the dies.

6. The combination in an electric welding machine of a supporting structure; two levers pivotally mounted thereon; water cooled electrode holders mounted on the levers and adjustable on axes substantially parallel to the pivot lines of the levers; electrodes carried by said holders; means for actuating the levers; and a source of current directly connected to the holders.

7. The combination in an electric welding machine of a supporting structure; two lever heads pivotally mounted thereon; means for swinging said heads on their pivots toward and from each other; electrode holders pivotally mounted on the heads and each having a slotted portion; clamping bolts passing through the slotted portions of said holders for holding them to the heads in any given positions; electrodes carried by the holders; a transformer; and conductors directly connecting the secondary of said transformer with said holders respectively.

8. The combination in an electric welding machine of a supporting table; a pair of levers pivotally mounted on said table; means for swinging said levers on their pivots toward and from each other; electrode holders respectively mounted on the levers; electrodes carried on the front portions of the holders; a carriage mounted on the table in front of and operative in a line between said electrodes; a pair of coacting dies operative vertically between the electrodes; a holder on the carriage for moving a link between the electrodes into position to have its weld shaped by the dies; and means for actuating the carriage.

9. The combination in an electric welding machine of a supporting structure; two levers pivotally mounted thereon; means for swinging said levers on their pivots toward and from each other; two electrode holders pivotally mounted on the levers and electrically insulated therefrom; electrodes carried by the holders; a transformer mounted above the holders and having its secondary connected to the same; and means for shaping the welded portion of a link after it has been heated between the electrodes.

10. The combination in an electric welding machine of a supporting structure; two levers pivotally mounted thereon; means for swinging the levers toward and from each other; electrode holders respectively mounted on the levers; electrodes carried by the holders; a transformer mounted above the levers; laterally flexible conductors electrically connecting the secondary of the transformer with the electrode holders respectively; a carriage mounted between the levers; a link holder mounted on the carriage in position to coöperate with the electrodes in supporting the link to be welded; and means for automatically moving said carriage to forcibly press the link toward the electrodes.

11. The combination in an electric welding machine of a supporting structure; two levers pivotally mounted thereon; means for swinging the levers toward and from each other; electrode holders respectively mounted on the levers; electrodes carried by the holders; a transformer mounted above the levers; laterally flexible conductors electrically connecting the secondary of the transformer with the electrode holders respectively: a carriage mounted between the levers; a link holder mounted on the carriage in position to coöperate with the electrodes in supporting the link to be welded; means for automatically moving said carriage toward and from the electrodes; with vertically movable dies positioned to act between the electrodes upon the welded portion of the link.

In witness whereof I affix my signature.

JOHN SENFT.